Figure 1:
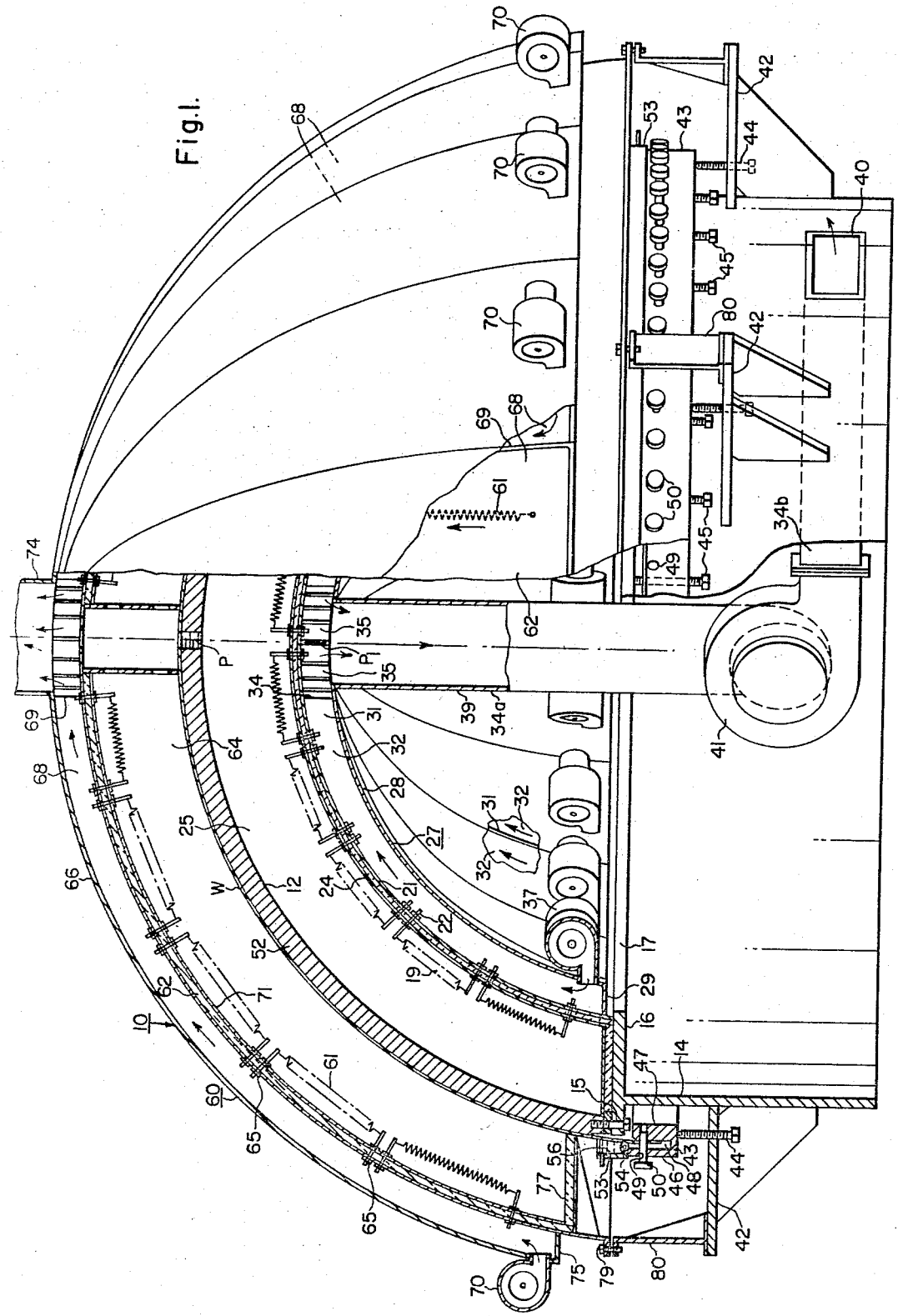

April 25, 1967  G. W. ELLENBURG  3,315,513

MATERIAL WORKING METHOD AND APPARATUS

Filed Jan. 15, 1964  2 Sheets-Sheet 1

April 25, 1967 G. W. ELLENBURG 3,315,513
MATERIAL WORKING METHOD AND APPARATUS
Filed Jan. 15, 1964 2 Sheets-Sheet 2

3,315,513
MATERIAL WORKING METHOD AND
APPARATUS
George W. Ellenburg, Ardmore, Pa., assignor to Westinghouse Electric Corporation, Pittsburgh, Pa., a corporation of Pennsylvania
Filed Jan. 15, 1964, Ser. No. 337,922
10 Claims. (Cl. 72—342)

This invention relates to material working and more particularly to the fabrication of hollow cup-shaped articles of relatively thin material.

In the fabrication of hollow cylindrical metal articles open at opposite ends, it has been proposed to "true" or impart a precise cylindrical configuration to the article by first placing a preliminary tubular workpiece of generally cylindrical form over a closely fitting mandrel having a truly precise cylindrical surface and formed of a metal having a higher coefficient of thermal expansion than the workpiece, then heating the workpiece and mandrel to the temperature required to thermally expand the mandrel to the degree required to stress the workpiece in tension. As well known, the stress in the thus heated workpiece, if maintained for a period of time, induces the metal to undergo "creep" action with little or no "spring back" or contraction after the stress is removed by cooling the mandrel and workpiece, thereby "creepforming" and enlarging the workpiece to the configuration of the mandrel.

The above method is satisfactory in forming cylindrical or tubular articles, since the stresses occur in radial directions normal to the longitudinal central axis of the article. However, it is ineffective in forming cup-shaped articles since, in such articles, the stresses occur in radial directions some of which have substantial components parallel to the central axis of the article tending to translate the workpiece instead of expanding it.

In view of the above, it is an object of this invention to provide a method for "truing" or imparting a precise configuration to a cup-shaped workpiece, by a mandrel employing differential thermal expansion between the workpiece and the mandrel, when heated, to provide the required creep inducing stresses in the workpiece.

A further object is to provide a method in accordance with the foregoing object in which a predetermined portion of the cup-shaped article subjected to the differential expansion stress is substantially prevented from creeping to any appreciable degree.

Yet another object is to provide apparatus for carrying out the above objects in a simple yet effective manner suitable for quantity production, wherein the final surface configuration and size of the workpieces are substantially within closely defined tolerances.

Hollow cup-shaped articles of large radius formed of relatively thin material such as metal, may be formed by spinning flat sheet metal to the required configuration, such as hemispherical, paraboloid, hyperboloid, conical, etc. However, spinning results in an article having small corrugations or annular irregularities that deviate from the required above surfaces of revolution. For example, if a hemispherical article is formed by spinning sheet material, the final configuration approaches, but does not attain the smooth truly spherical surface required.

Briefly, in accordance with the invention, the method comprises:

Placing a preliminary cup-shaped workpiece in nesting relation with a closely fitting mandrel having a smooth outer surface precisely formed to the required final shape of the workpeice and formed of material having a higher coefficient of thermal expansion;

Drawing the workpiece tightly onto the mandrel to take up substantially all of the slack in a direction parallel to the central longitudinal axes of the workpiece and mandrel;

Securing the workpiece, along its annular marginal portion defining the opening in the workpiece, against axial translation in disengaging direction;

Maintaining said annular portion at a temperature substantially lower than the remainder of the workpiece to minimize "creeping" thereof;

Heating the workpiece and mandrel to a predetermined elevated temperature at which the differential thermal expansion induces stresses in the workpiece in radially outwardly directions, some of the stresses having substantial components parallel to the central axis of the workpiece;

Maintaining the workpiece and mandrel at the elevated temperature for a length of time sufficient to permit distention of the workpiece material to occur by creeping action; and Cooling the mandrel and workpiece to permit removal of the thus "sized" and "trued" workpiece.

The novel apparatus for carrying out the above method briefly comprises a hollow cup-shaped mandrel supported in inverted position upon a base, with its open end lowermost. The external surface of the mandrel is smoothly and precisely formed to the configuration that it is intended to impart to the workpiece, when heated to the prescribed temperature, and a group of heaters, such as electric heating elements or lamps are disposed within the mandrel for heating the same.

Around the lower periphery of the mandrel, there is provided an annular draw bar structure with means to grip the marginal portion defining the opening in the workpiece and suitable means, such as draw screws, are further provided for positioning the drawbar, as required to take up the slack between the workpiece and mandrel and to hold the workpiece against axial movement during the heating operation.

The marginal portion of the workpiece is prevented from creeping during operation of the apparatus by a cooling arrangement defining an annular trough, to which cooling liquid such as water is supplied.

A dome-shaped hood having a group of heaters for heating the workpiece is also provided. The hood is removably mounted on the base to permit insertion and removal of the workpiece from the mandrel.

When the heaters are tubular quartz lamps, reflectors are provided to direct the heat rays toward the mandrel and workpiece, and the lamp terminals are prevented from undesirable overheating by circulating coolant air therepast, which air is provided by a plurality of motor-driven blowers.

Figure 2:
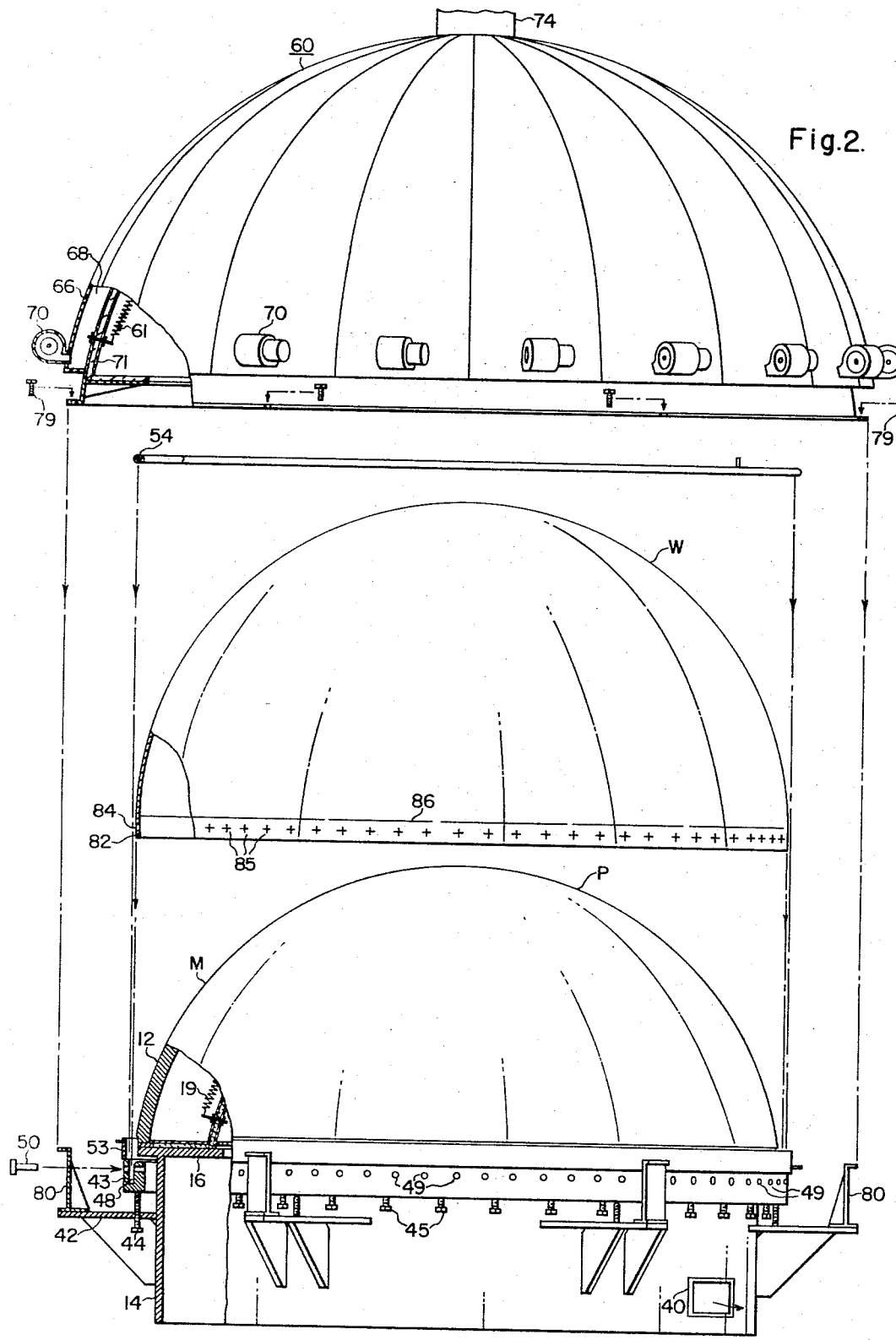

The above and the objects are effected by the invention as will be apparent from the following description and claims, taken in connection with the accompanying drawings, forming a part of this application, in which:

FIGURE 1 is a side elevational view of apparatus for forming a cup-shaped workpiece in accordance with the invention, with the left-hand portion shown in vertical section to show structural details; and FIGURE 2 is a vertically "exploded" view of the apparatus and workpiece.

Referring to the drawings in detail, there is shown apparatus generally designated 10 formed in accordance with one aspect of the invention. The apparatus 10 includes a mandrel 12 of hollow dome shaped or cup-shaped form disposed in inverted relation with a supporting base structure 14 and attached thereto by suitable bolts 15. As illustrated, the mandrel 12 is of hemispherical form and of substantial transverse thickness.

The base 14, as illustrated, is of generally cylindrical form having an upper flange 16 of annular form defining a central opening 17. Within the bight of the mandrel 12 there are provided a plurality of rows of thermostatically controlled electrical heating devices such as lamps 19. The lamps 19 are preferably arranged in rows extending along longitudinal lines radiating from the apex or pole P of the mandrel 12 and are supported by a generally hemispherical support structure 21 of smaller radius than the mandrel 12 and disposed with its central axis in substantial alignment with the central axis of the mandrel 12. As illustrated, the lamps 19 are disposed in internally and uniformly spaced relation with the internal surface of the mandrel. The lamps are provided with electrical terminals 22 extending through the support structure 21 and connected to an electrical power supply (not shown) in any suitable manner. The heat rays from the lamps 19 are directed in radially outwardly direction toward the mandrel 12 and, to enhance the heating effect of the lamps 19, the support structure 21 is provided with a light reflecting member 24 formed of any suitable reflective material.

As will later be more fully described in connection with the method forming an important part of this invention, the lamps 19 are operated at high temperatures sufficient to heat the mandrel to about 1250° F. and, during such prolonged operation, the terminals 22 of the lamps 19 become heated to excessively high values by the conducted heat from the space 25 defined by the support structure 21 and the mandrel 12. This conducted heat is highly objectionable since, if permitted to occur, it will reduce the life expectancy of the lamps 19.

Accordingly, there is provided an internal duct structure 27 having a hemispherical wall portion 28 disposed in internally concentrically spaced relation with the lamp support structure 21 and having an annular outwardly extending flange 29 connected to the lamp support structure 21 throughout its peripheral extent. The duct structure 27 includes a plurality of partition members 31 extending from the flange 29 to the apex or pole P' along longitudinal planes, thereby forming together with the lamp support structure 21 a plurality of flow passages 32 extending from the flange 29 to the pole P' of the duct structure 27. The partitions 31 are preferably equally spaced with relation to each other and terminate at 34 in a region adjacent to the pole P' and somewhat less than 90° from the flange 29, thereby defining an annular array of outlets 35.

Each of the flow passages 32 is provided with a motor-driven blower 37 for blowing air through the flow passages 32 towards the outlets 35, thereby removing the accumulated heat from the flow passages 32 and minimizing overheating of the lamp terminals 22 by removal of the thus heated air therefrom during operation.

The duct structure 27 further includes a tubular duct structure 39 having one end disposed in communication with the outlets 35 of the flow passages 32 and its opposite end 40 extending through the base 14 and discharging into the atmosphere. Interposed in the duct structure 39 is a blower 41 of larger capacity than the individual blowers 37 and serving to further assist in withdrawing the heated air delivered to the duct structure 39 by the blowers 37. As illustrated, the duct structure 39 includes a first portion 39a extending along the central vertical axis of the apparatus and a portion 39b extending transversely to the axis of the apparatus and disposed below the mounting flange 16 of the base 14.

The base structure 14 is further provided with a plurality of brackets 42 disposed at a lower level than the flange 16 and, between the brackets 42 and the flange 16 there is provided a ring-shaped drawbar member 43 disposed in encompassing relation with the base 14 and positionable in vertical direction by a plurality of adjustable screws 44 threadedly received in the brackets 42 and bearing on the lower surface of the drawbar 43.

Also, the drawbar 43 is provided with an annular array of drawbolts 45 threadedly received therein and bearing on the lower surface of the flange 16.

The drawbar ring member 43 is of generally U-shaped cross section having an outer ring portion 46 and a concentric inner ring portion 47 disposed in radially spaced relation to each other and having an annular groove 48 therebetween. The ring portions 46 and 47 are provided with an annular array of concentrically aligned and radially extending bores 49 through which a plurality of dowel pin members 50 are adapted to extend. The outer circumferential surface of the inner ring 47 is substantially of the same radial extent as the outer-most wall surface 52 of the mandrel 12.

There is further provided a channel ring member 53 disposed in encompassing relation with the mandrel 12 and, supported by the drawbar 43. The channel ring 53 is disposed in radially spaced relation with the mandrel 12 and between the channel ring 53 and the mandrel 12, there is provided a toroidal inflatable sealing member 54 which, when in the relaxed or noninflated state, is freely receivable in the lower portion of the space between the channel ring 53 and the mandrel 12. When the inflatable seal ring 54 is inflated, it expands in cross-sectional area to provide a seal between the channel ring 53 and the mandrel 12 and, jointly therewith, forms an annular trough 56 to which water or other suitable liquid may be admitted for a purpose which will subsequently be described.

In operation, a workpiece W of preliminary hollow cup-shape and generally of the same size and shape as the external surface 52 of the mandrel 12 is superimposed in nesting relation with the mandrel 12 for shaping to a final desired size, shape, and smoothness of configuration.

A dome-shaped hood structure 60 is further provided comprising a plurality of thermostatically controlled electrical heating lamps 61, similar to the lamps 19 heretofore described, preferably arranged in longitudinal rows radiating from the apex of the apparatus. The lamps 61 are supported in a substantially similar but opposite manner to the lamps 19. That is, the lamps are mounted upon a lamp support structure 62 of generally hemispherical shape and are disposed within the space 64 formed by the lamp support structure 62 and the mandrel 12 so that, in operation, they are effective to direct heat towards the mandrel 12 and the workpiece W. The lamps 61 are provided with electrical terminals 65 extending radially outwardly through the support structure 62 and are connected to an electrical power supply (not shown) in any desirable manner. The hood structure further may be provided with an external hemispherical wall structure 66 disposed in concentrically and radially outwardly spaced relation with the lamp support structure 62 and jointly therewith defines a space 67 of uniform radial extent throughout.

In a manner similar to that employed in conjunction with the lamps 19, the space 67 is divided into a plurality of longitudinally extending flow passages 68 by longitudinal partition structures 69 and each of the flow passages 68 is provided with pressurized air by individual motor driven blowers 70 attached to and carried by the external wall structure 66. The lamp support structure 62 is further provided with a reflector member 71 formed of light reflecting material and disposed between the lamps 61 and the structure 62 for directing and reflecting heat and light from the lamps 61 towards the workpiece W. The passages 68 converge at the apex of the dome structure 60 and communicate with a tubular exhaust duct 74 extending vertically upwardly therefrom.

The hood structure 60 is further provided with a circumferential end wall portion 75 disposed between the lamp support structure 62 and the external wall member 66, and a circumferential wall portion 77 extending radially inwardly from the lamp support structure 62 but terminating short of the mandrel 12 to a small degree. The hood structure 60 is removably supported by the brackets 42 and may be attached thereto by a plurality of suitable bolts 19 or similar fastening means threadedly received in angle members 80 extending upwardly from the brackets 42.

Referring now to FIGURE 2 it will be seen that the mandrel 12 and the array of heating lamps 19, as well as the base 14 and the associated components thereof are unitary, while the dome structure 60 is also unitary and superimposable upon the base during operation.

*Method of operation*

To operate the apparatus described above in accordance with the invention, the drawbar structure 43 is moved in axially upwardly direction to substantially the limit of its upward travel by rotating the screws 44 in one direction, after the draw bolts 45 are rotated to their substantially lowermost positions to permit the upward movement of the drawbar structure 43 by the screws 44. The preliminary workpiece W is then lowered over the mandrel 12 until its innermost surface is in seated or resting abutment with the external surface 52 of the mandrel. The workpiece W, as best shown in FIGURE 2, is preferably formed with an annular lower portion 82 or skirt extending downwardly beyond the mandrel 12 when the workpiece W is in fully seated position upon the mandrel 12. The skirt 82 is substantially concentric with the central axis of the workpiece and the mandrel 12 and is employed for holding the workpiece in tightly engaging relation with the mandrel 12.

After the workpiece W is lowered into position upon the mandrel 12, with its skirt portion 82 disposed in mating relation with the annular groove 48 in the drawbar member 43, the bores 49 in the drawbar 43 are employed as drill guides and an equal plurality of holes 84 are thus drilled in the skirt 82, as indicated by the plus marks 85 in the workpiece in FIGURE 2. After the holes 84 are thus drilled, the dowel pins 50 are positioned, as indicated in FIGURE 1, to retain the workpiece W in firm non-slippable engagement with the drawbar member 43.

Subsequent thereto, the screws 44 are retracted and the draw bolts 45 are rotated in a direction to bear against the flange 16 of the base 14, thereby drawing the drawbar 43 together with the workpiece W in downward direction to its final position, in which position any slack between the workpiece and the mandrel 12 is taken up.

Subsequent thereto, the sealing ring member 54 is lowered into position within the channel ring 53 and inflated to provide the trough 56 into which water or other liquid is then admitted to a suitable height for cooling the skirt portion 82 of the workpiece, and the drawbar 43 as well.

The hood structure 60 is then lowered into position and fastened to the brackets 80 on the base 14 by the bolts 79 to provide a substantially sealed enclosure for the workpiece during the sizing operation.

The mandrel 12 is formed of a metal having a substantially higher coefficient of thermal expansion than the material of the workpiece W and its surface is further smoothly and precisely finished to the required configuration that it is desired to impart to the workpiece W. The size of the mandrel is slightly smaller than the final required size of the workpiece.

The workpiece W, on the other hand, is of generally the same shape as the mandrel 12 but deviates from the required optimum or final configuration. The workpiece is formed of metal, for example, of substantially thinner cross section than the mandrel 12 so that, to all extents and purposes, the mandrel 12 is substantially unyieldable due to the stresses subsequently to be imposed thereon, while the workpiece is readily yieldable under such stresses.

By way of example, the radius of the workpiece in one particular application is 60.080″, and it is desired to expand the workpiece to a final dimension in which the radius is 60.220″. The workpiece in this example is made of medium carbon tool steel having a thermal coefficient of expansion at 1200° F. of $7.85 \times 10^{-6}$ inch/inch/° F. while, on the other hand, the mandrel 12 is formed of a stainless steel having a coefficient of thermal expansion at 1200° F. of $10.5 \times 10^{-6}$ inch/inch/° F. Although the thermal coefficients of expansion of the mandrel and of the workpiece vary as the two members are heated, the average differential coefficient of thermal expansion is on the order of about $2.2 \times 10^{-6}$ inch/inch/° F.

The workpiece W is heated from both sides, that is from its internal side as well as its external side by the heaters 19 and the heaters 61, respectively.

The heating cycle is as follows:

(1) The heaters 19 and 61 are energized for a sufficient length of time to raise the temperature of the workpiece W and the slower heating mandrel 12 to about 1150° F. over a substantial period of time in order to minimize occurrence of adverse thermal gradients therein.

(2) When both the mandrel and the workpiece attain the same temperature throughout, the heating lamps are further energized in such a manner that the temperature of both members is gradually raised to about 1250° F.

(3) The two members are maintained at, or about, the temperature of 1250° F. for a sufficient length of time to permit the stresses in the workpiece to distend the workpiece by creeping action. (At this high temperature, the creeping action of the workpiece is relatively high.) Maintaining the temperature at about 1250° F. for a period of time insures that the workpiece is also stress relieved and will have substantially no tendency to return to its original size when cooled.

(4) During the above heating operations, the water in the trough 56 prevents the skirt portion 82 of the workpiece from becoming heated to the same extent as the remainder of the workpiece and thereby minimizes stretching in this region of the workpiece, so that all of the stretching or substantially all of the stretching occurs in the remainder or the hemispherical portion of the workpiece.

(5) The heating lamps 19 and 61 are then gradually deenergized and the workpiece and mandrel are gradually cooled.

(6) During the above heating and cooling operations, the blowers 37, 70 and the main blower 41 are actuated to continuously circulate air through the flow passages 32 within the mandrel and the flow passages 68 within the hood structure 60.

(7) The hood structure 60 is then removed after the blowers are deenergized, thereby rendering the workpiece freely accessible for removal from the mandrel 12.

(8) The dowel pins 50 are then removed from the drawbar structure 43 and the sealing member 54 is deflated and removed to free the now enlarged workpiece from the mandrel. In the event that the pins 50 are not freely removable, the draw bolts 45 may be rotated to a slight degree to relax any residual tension on the workpiece and the dowel pins 50, as well.

(9) Subsequent to removal of the workpiece W in its finally and accurately shaped configuration, the skirt portion 82 thereof may be severed along the dot-and-dash line 86. The workpiece W is then in the truly hemispherical form and size desired.

The workpiece W may be preliminarily formed by any suitable operation such as, for example, spinning from a sheet of material. During such spinning operation, although the general contour is attained, the spinning does impart irregular convolutions or corrugations that depart from the final shape required, as well as the smoothness of surface required. The above irregularities in the workpiece are expeditiously removed by the above method, since the mandrel 12 expands radially and uniformly during the heating operation, thereby still maintaining the precise geometric final configuration required.

The above method of operation may be modified, if desired, to permit further expansion of the workpiece, if required, by rotating the draw bolts 45 from time to time during the heating and creeping operation, thereby increasing the tension in the workpiece while it is being heated to the final temperature required for sizing. This step is preferably employed while the workpiece is heated by the external lamps 61, since at that time, the workpiece may be enlarged because of its own thermal expansion to a degree wherein the tension originally provided by the drawbar member 43 is reduced.

It may be further desired to repeat the above sizing operation of the workpiece to obtain a smoother and more precise final configuration to the workpiece. In such an event, it is merely necessary to repeat the operation described in the method steps outlined above. However, it must be pointed out that during the second sizing operation, since the workpiece is already enlarged to its substantially final size of configuration, the draw bolts 45 will draw the workpiece downwardly over the mandrel 12 to a further degree than in the original drawing operation and, since the workpiece is in its more nearly final configuration, the subsequent expansion of the workpiece by creeping action due to the differential thermal expansion of the two members will be effective to stretch the workpiece to a smoother and more precise final configuration.

During the heating operation and concomitant expansion of the mandrel 12 and stressing of the workpiece W, the stresses due to expansion of the mandrel 12 are transmitted to the workpiece W in a plurality of radial directions. However, since the workpiece and the mandrel are of hollow cup-shape, substantially all of the stresses have axial components (that is, components parallel to the central axis of the workpiece and the mandrel) and these axial components tend to move the workpiece axially out of engagement with the mandrel or upwardly, as viewed in the figures. However, these components are effectively resisted by the drawbar structure 43 which is effective to hold the skirt portion 82 of the workpiece against upward movement and therefore provide the necessary reaction forces to prevent such upward movement of the workpiece. Substantially all of the reaction forces to such axial components are transmitted through the dowel pins 50 to the skirt portion 82. However, since the skirt portion is maintained at a considerably lower temperature than the remainder of the workpiece W, the skirt portion incurs a minimum of creeping. Hence, the stretching action in this highly stressed area of the workpiece is minimized, so that all of the stress forces are effective to expand and stretch the remainder of the workpiece to the final configuration.

It will now be seen that the invention provides a novel method for providing a desired configuration to a hollow cup-shaped article by employment of differential expansion between the forming member and the work-piece.

It will further be seen that the invention provides novel apparatus for practicing the method of thus forming a preliminary workpiece to its final configuration.

The invention is highly advantageous for forming and sizing cup-shaped articles, since the final size of the article may be accurately controlled by modifying the temperature at which the cup-forming is attained. Also, after creep-forming, the article is in a stress-free state, thus insuring future stability and virtually no "spring-back" from the final size and shape.

Although for simplicity of discussion and explanation, the mandrel 12 and the workpiece W have been described as being of hemispherical shape, the invention is not so limited and is applicable to the final forming of hollow cup-shaped workpieces of any shape. Examples of such hollow-cup shapes are hyperboloid, paraboloid, conical and shapes approaching the above geometric forms but not readily definable by geometric expressions.

I claim as my invention:

1. The method of truing an open end hollow cup-shaped workpiece having an annular marginal portion defining said open end and increasing in cross-section towards its open end, which method comprises the following steps:
    (a) placing said cup-shaped workpiece in nesting abutment with a similarly but more precisely male mating mandrel formed of material having a larger coefficient of thermal expansion than said workpiece;
    (b) drawing said workpiece into snugly fitting engagement with said mandrel to take up the slack in axial direction;
    (c) securing said workpiece adjacent said marginal portion to hold the workpiece against axial movement; and
    (d) heating said mandrel to a temperature at which the resulting thermal expansion of the mandrel is effective to distend and true said workpiece.

2. The method of truing and sizing to a desired final shape and size a hollow cup-shaped workpiece of increasing annular cross-section towards its open end, and having an annular marginal portion defining said open end, which method comprises the following steps:
    (a) placing said cup-shaped workpiece in encompassing abutting relation with a male mating mandrel formed of material having a larger coefficient of thermal expansion than said workpiece and having a precisely and smoothly formed external surface shape conforming generally to the internal surface of said workpiece;
    (b) drawing said workpiece into snugly fitting engagement with said mandrel to take up the slack in axial direction;
    (c) securing said workpiece adjacent said marginal portion to hold the workpiece against axial movement;
    (d) heating said mandrel to an elevated temperature at which the resulting thermal expansion of the mandrel is effective to stress and distend said workpiece and impart to said workpiece the precise surface shape of said mandrel;
    (e) cooling said mandrel and workpiece to effect thermal contraction of said mandrel and workpiece and permit release of said workpiece; and
    (f) removing said workpiece from said mandrel.

3. The method of truing and sizing to a desired final hemispherical shape and size a metal workpiece of hollow generally hemispherical shape and having an opening, which method comprises the following steps:
    (a) placing the workpiece in encompassing abutting relation with a mating male hemispherical mandrel formed of metal having a larger coefficient of thermal expansion than said workpiece and having a smooth external surface portion of more precise hemispherical shape than said workpiece;
    (b) securing an annular marginal portion of said workpiece adjacent said opening to prevent movement of said workpiece relative to the central longitudinal axis of said mandrel; and
    (c) heating said mandrel to an elevated temperature at which the resulting differential thermal expansion between the workpiece and the mandrel is effective to stretch said workpiece to the final size and trueness of shape.

4. The method recited in claim 3 in which the workpiece is formed of a metal having creep characteristics when subjected to heat and stress, and including the steps of:
    (a) heating the workpiece to a temperature sufficiently high to permit creeping to occur, and
    (b) cooling the secured portion of the workpiece to minimize creeping of said portion.

5. The method of truing to a desired finel hollow hemispherical shape of predetermined radius a hollow steel workpiece of generally varying cross-section normal to its central axis and having an annular peripheral marginal portion defining an open end, which method comprises the following steps:
(a) placing the workpiece in nesting abutment with a male mating mandrel formed of steel having a larger coefficient of thermal expansion than said workpiece and having an external surface of smoother and more precise hemispherical shape than said workpiece;
(b) securing said workpiece along said peripheral marginal portion to prevent movement relative to the central axis of said mandrel;
(c) heating said mandrel and said workpiece to an elevated temperature at which the resulting differential expansion between said mandrel and said workpiece is effective to stress said workpiece;
(d) maintaining said mandrel and said workpiece at substantially said elevated temperature for a period of time sufficient to distend said workpiece to the desired final shape by creeping of the workpiece;
(e) maintaining said marginal portion in a relatively cool state during steps (c) and (d);
(f) cooling said mandrel to effect thermal contraction of said mandrel and release of said workpiece; and
(g) removing said workpiece from said mandrel.

6. Apparatus for truing and sizing a hollow cup-shaped workpiece to a desired configuration comprising:
a hollow cup-shaped mating mandrel having an external surface configuration precisely formed to the desired configuration and formed of metal having a greater coefficient of thermal expansion than that of said workpiece,
a base for supporting said mandrel,
heating means disposed within said mandrel for effecting thermal expansion of said mandrel and heating said workpiece,
an annular member encompassing said base and having a central axis substantially aligned with the central axis of said mandrel,
means associated with said annular member for securing said workpiece thereto, and
means for urging said member in axial direction away from said mandrel.

7. The structure recited in claim 6 and further including:
heating means disposed externally of said mandrel for heating the workpiece.

8. The structure recited in claim 6 and further including:
a removable hood disposed externally of the mandrel for enclosing the latter, and
heating means disposed in said hood.

9. Apparatus for truing and sizing by creep action, a hollow cup-shaped workpiece having an annular marginal portion, to a desired configuration comprising:
a hollow cup-shaped mating mandrel having an external surface configuration precisely conforming to the desired configuration and formed of metal having a greater coefficient of thermal expansion than that of said workpiece,
said mandrel having an open end and a central axis extending through said open end,
a base supporting said mandrel in inverted position adjacent said open end,
first heating means disposed within said mandrel for directing heat to said mandrel,
a dome-shaped hood removably disposed in externally spaced relation with said mandrel for enclosing the latter,
second heating means disposed in said hood for directing heat toward said mandrel,
an annular drawbar structure disposed adjacent said opening and in alignment with said mandrel,
means associated with said drawbar structure for securing said workpiece adjacent its marginal portion to said drawbar,
means for adjustably positioning said drawbar structure along a path of movement parallel to said central axis, and
an annular cooling structure disposed adjacent said drawbar structure for minimizing the heating effect on said drawbar by said heating means.

10. The structure recited in claim 9 in which said cooling structure comprises:
a ring member disposed in spaced encompassing relation with the mandrel,
an annular inflatable tubular sealing member interposable in the space between the ring member and the mandrel to provide an annular trough, and
means for admitting a liquid coolant to said trough.

References Cited by the Examiner

UNITED STATES PATENTS

| | | | |
|---|---|---|---|
| 2,395,832 | 3/1946 | Jager et al. | 72—392 |
| 2,905,225 | 9/1959 | Lalli | 72—34 |
| 3,060,564 | 10/1962 | Corral | 72—342 |

FOREIGN PATENTS

| | | |
|---|---|---|
| 890,035 | 9/1953 | Germany. |

CHARLES W. LANHAM, *Primary Examiner.*

L. A. LARSON, *Assistant Examiner.*